(12) United States Patent
Rawls

(10) Patent No.: US 12,709,152 B2
(45) Date of Patent: Aug. 18, 2026

(54) HYDRAULIC MOBILE CART FOR PRODUCE HARVESTING

(71) Applicant: Conya Rawls, Brilliant, AL (US)

(72) Inventor: Conya Rawls, Brilliant, AL (US)

( * ) Notice: Subject to any disclaimer, the term of this patent is extended or adjusted under 35 U.S.C. 154(b) by 260 days.

(21) Appl. No.: 18/539,558

(22) Filed: Dec. 14, 2023

(65) Prior Publication Data

US 2024/0208325 A1 Jun. 27, 2024

Related U.S. Application Data

(60) Provisional application No. 63/434,725, filed on Dec. 22, 2022.

(51) Int. Cl.

| | |
|---|---|
| ***B60K 16/00*** | (2020.01) |
| ***A01D 46/00*** | (2006.01) |
| ***B60K 26/02*** | (2006.01) |
| ***B60R 16/033*** | (2006.01) |
| ***F15B 13/042*** | (2006.01) |
| ***F15B 15/18*** | (2006.01) |

(52) U.S. Cl.

CPC .............. *B60K 16/00* (2013.01); *B60K 26/02* (2013.01); *B60R 16/033* (2013.01); *F15B 13/0422* (2013.01); *F15B 15/18* (2013.01); *A01D 46/00* (2013.01); *B60K 2016/003* (2013.01); *F15B 2211/324* (2013.01)

(58) Field of Classification Search

CPC .. B60K 16/00; B60K 26/02; B60K 2016/003; B60R 16/033; F15B 13/0422; F15B 15/18; F15B 2211/324; A01D 46/00; A01D 46/243

See application file for complete search history.

(56) References Cited

U.S. PATENT DOCUMENTS

| | | | | |
|---|---|---|---|---|
| 3,203,562 | A | 8/1965 | Long | |
| 3,217,823 | A | 11/1965 | Balthes | |
| 3,361,224 | A | 1/1968 | Mckim | |
| 4,234,203 | A | 11/1980 | Johnson | |
| 4,395,186 | A | 7/1983 | Whyte | |
| 6,296,119 | B1 * | 10/2001 | Wells | B65D 5/324 229/120.37 |
| 9,096,151 | B2 * | 8/2015 | Canonge | B60N 2/22 |
| 9,357,707 | B1 * | 6/2016 | Paulin | A01D 46/243 |

(Continued)

*Primary Examiner* — Rami Khatib

(74) *Attorney, Agent, or Firm* — Boudwin Intellectual Property Law, LLC

(57) ABSTRACT

A hydraulic mobile cart for produce harvesting that provides shade and places an operator in close proximity to a ground surface for efficient and relatively low impact harvesting of produce. An upper canopy covers the operator and picking areas adjacent to the sides of the hydraulic mobile cart, and also includes solar panels for charging a battery which powers a hydraulic drive motor. The seating area includes a cushioned sliding seat for the comfort of the operator, a footrest with a motion push button, a steering wheel for directional control, and a hand lever for forward and reverse operation. An oil catch pan is positioned underneath the battery and the drive motor to catch any liquids that could possibly leak from the motor or the battery to protect crops from contamination. The frame also supports harvesting containers and may include interchangeable plates for various harvesting container types.

13 Claims, 9 Drawing Sheets

(56) References Cited

U.S. PATENT DOCUMENTS

| | | | | |
|---|---|---|---|---|
| 2008/0216458 | A1* | 9/2008 | Lucas | H02P 4/00 56/10.6 |
| 2012/0181095 | A1* | 7/2012 | Lopez | B60L 8/003 180/2.2 |
| 2014/0265183 | A1 | 9/2014 | Grossberger | |
| 2015/0075880 | A1* | 3/2015 | Grossen | A01D 46/243 180/2.2 |
| 2019/0305588 | A1* | 10/2019 | Libra | H02J 9/08 |
| 2022/0087096 | A1* | 3/2022 | Freepons | A01C 11/02 |
| 2023/0380332 | A1* | 11/2023 | Black | A01C 19/02 |

* cited by examiner

HYDRAULIC MOBILE CART FOR PRODUCE HARVESTING

CROSS REFERENCE TO RELATED APPLICATIONS

This application claims the benefit of U.S. Provisional Application No. 63/434,725 filed on Dec. 22, 2022. The above identified patent application is herein incorporated by reference in its entirety to provide continuity of disclosure.

BACKGROUND OF THE INVENTION

Field of the Invention

The present invention relates to a hydraulic mobile cart. More particularly, the present invention pertains to a hydraulic mobile cart for produce harvesting.

Harvesting produce, such as fruits and vegetables, may be an extremely exhausting task for farmers. Produce typically grows relatively low to the ground and often requires frequent stooping or bending by a standing operator to properly harvest the ripe produce, which may also include a substantial load. Physical fatigue may quickly set in, slowing further harvesting operations. Additionally, heat stroke, sunburn, and other ailments may occur harvesting for hours under a bright sun. Typical methods of cooling off or keeping the sun at bay, such as wearing large-brimmed hats, resting in the shade, or the like are often minimally effective. Excessive Ultraviolet or UV exposure may further put farmers at increased risk of significantly harmful ailments, such as skin cancer, over an extended time frame.

In order to address these concerns, the present invention provides a vehicle that provides shade and places the operator in close proximity to the ground for efficient and low impact harvesting of produce.

SUMMARY OF THE INVENTION

The present invention relates to a hydraulic mobile cart. More particularly, the present invention pertains to a hydraulic mobile cart for produce harvesting.

The hydraulic mobile cart for produce harvesting may include a wheeled vehicle having a frame that includes a seating area adapted to be disposed in close proximity to a ground surface over which the wheeled vehicle travels to reduce bending and effort adapted to harvest a plurality of produce, an upper canopy adapted to cover an operator and picking areas adjacent to a pair of sides of the wheeled vehicle, a plurality of solar panels disposed on the upper canopy, the solar panels charge a pair of batteries which power a hydraulic drive motor, a plurality of harvesting containers supported by the harvest container holding plate that is supported by the frame, the cart is equipped with a plurality of interchangeable plates to accommodate a plurality of different types of the harvesting containers, and a harvest container holding plate affixed to the frame adjacent to the seating area.

It is an object of the present invention to provide a hydraulic mobile cart for produce harvesting that includes a seating area disposed in close proximity to a ground surface over which the hydraulic mobile cart travels to reduce the frequency of bending and effort required to harvest produce.

It is an object of the present invention to provide a hydraulic mobile cart for produce harvesting that include a plurality of apertures disposed in a regular grid pattern to evenly distribute weight across harvest container holding plate.

It is an object of the present invention to provide a hydraulic mobile cart for produce harvesting that allows multiple beds of produce to be harvested in a single pass, thereby increasing efficiency and simplicity of harvesting.

It is an object of the present invention to provide a hydraulic mobile cart for produce harvesting that includes a TEFC electric motor that provides protection from environmental elements such as dust, dirt, and water and the like.

It is an object of the present invention to provide a hydraulic mobile cart for produce harvesting that includes a continuous duty cycle motor to operate continuously without overheating or suffering damage.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
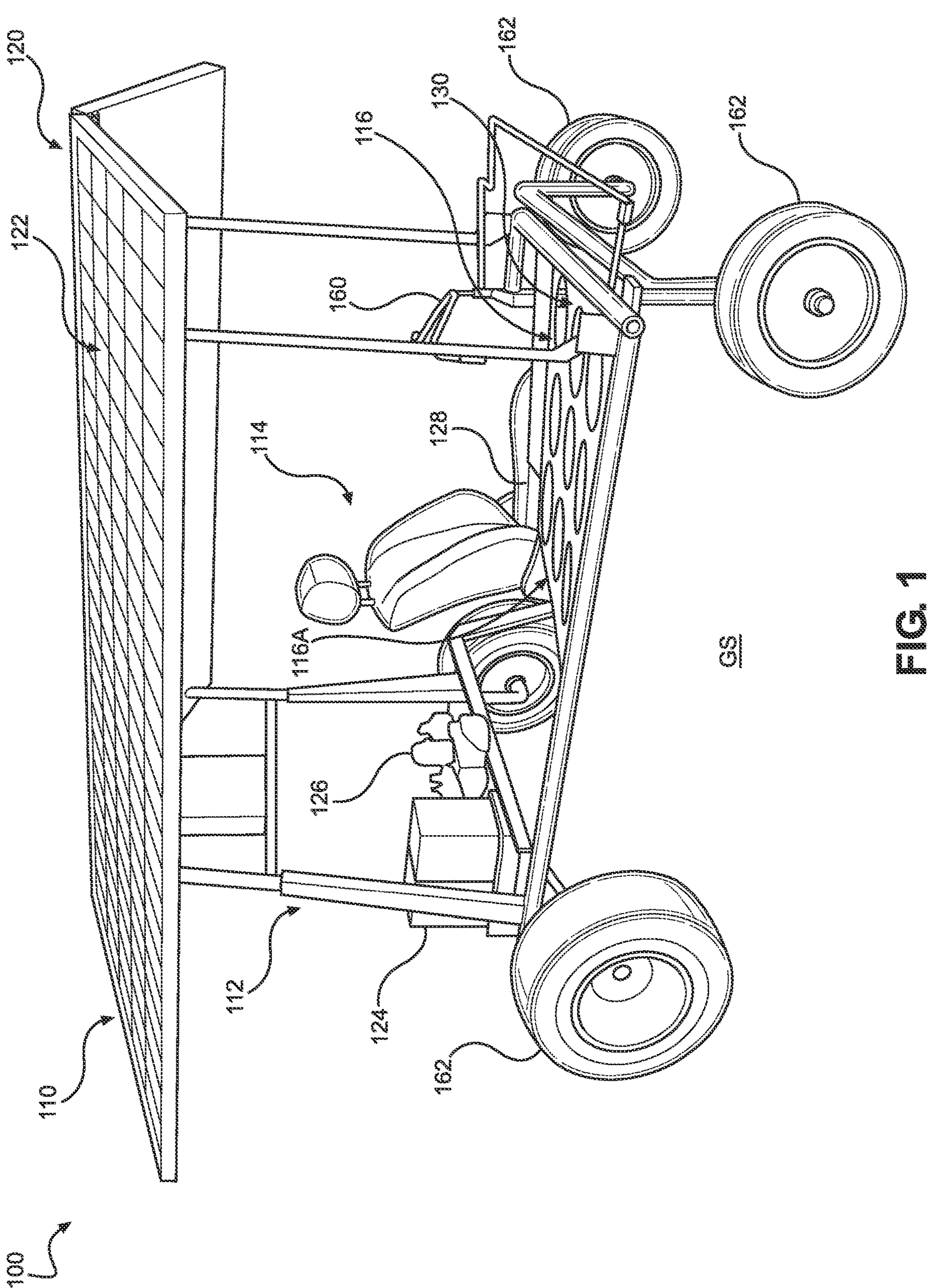
FIG. 1 shows a first side perspective view of an embodiment of a hydraulic mobile cart.
Figure 4:
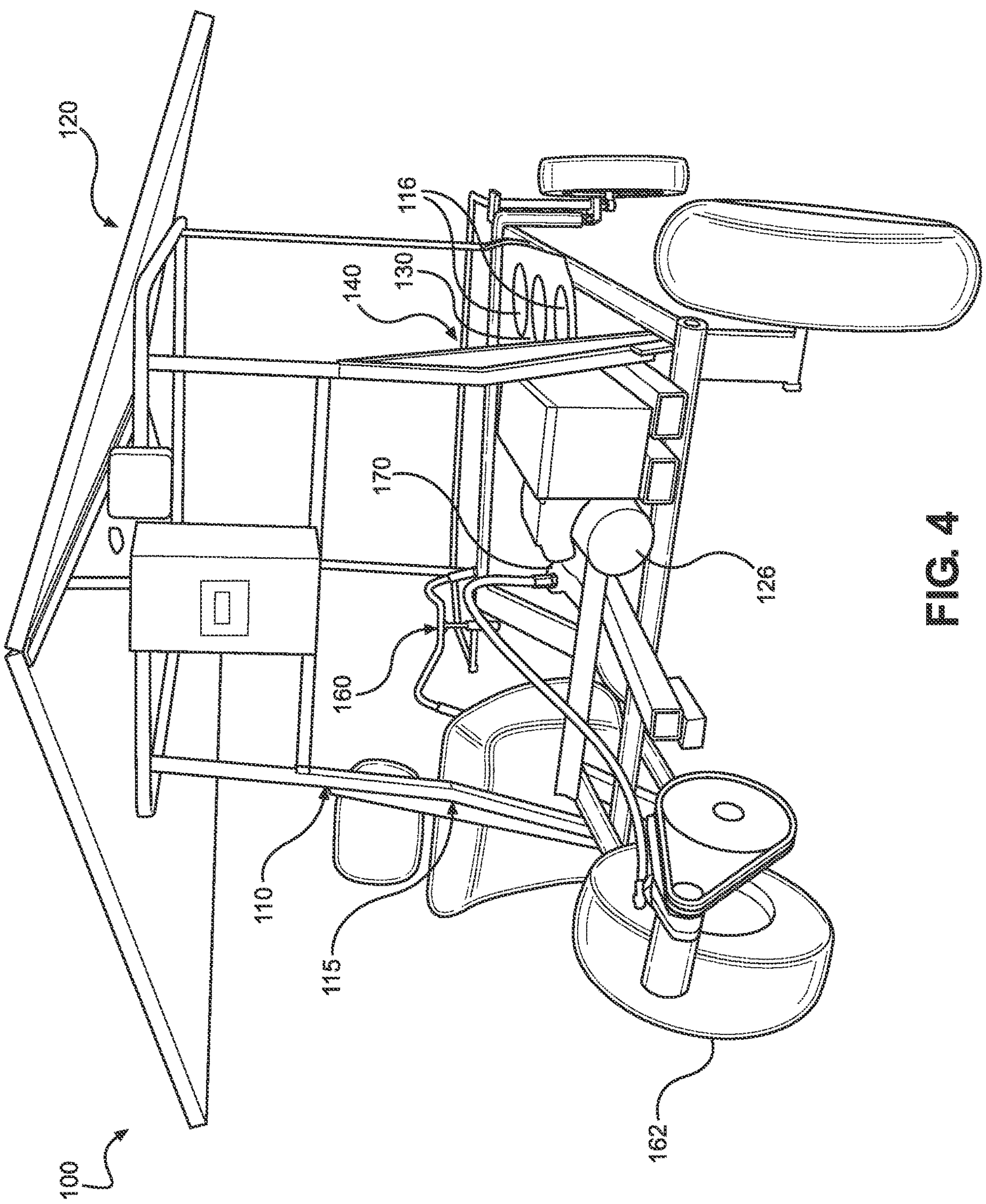
FIG. 4 shows a rear perspective view of an embodiment of the hydraulic mobile cart.

Referring now to FIGS. 1 and 4, there is shown a first perspective side view of an embodiment of a hydraulic mobile cart for produce harvesting (known as a hydraulic mobile cart 100) and a rear perspective view of an embodiment of the hydraulic mobile cart 100, respectively.

The hydraulic mobile cart 100 may include a wheeled vehicle 110, an upper canopy 120, and a harvest container holding plate 130.

The wheeled vehicle 110 may include a frame 112 which may include a seating area 114 that may support an operator (not shown). The seating area 114 may be disposed in close proximity to a ground surface (GS) over which the hydraulic mobile cart 100 travels to reduce the frequency of bending and effort required to harvest produce.

The upper canopy 120 may cover the operator and picking areas adjacent to the sides of the hydraulic mobile cart 100, and also includes a plurality of solar panels 122 for charging a pair of batteries 124 which may power a hydraulic drive motor 126. The seating area 114 may include a cushioned sliding seat 128 for the comfort of the operator, wherein the cushioned sliding seat 128 may be configured to slide along a longitudinal axis of the frame 112 to position the operator forward or rearward relative thereto.

The harvest container holding plate 130 may comprise a plurality of circular apertures 116 therethrough, and wherein the plurality of circular apertures 116 may be dimensioned to removably secure a harvesting bucket (not shown) therein. In the shown embodiment, the circular apertures 116 may be disposed in a regular grid pattern 116A to evenly distribute weight across harvest container holding plate the harvest container holding plate 130.

Figure 2:
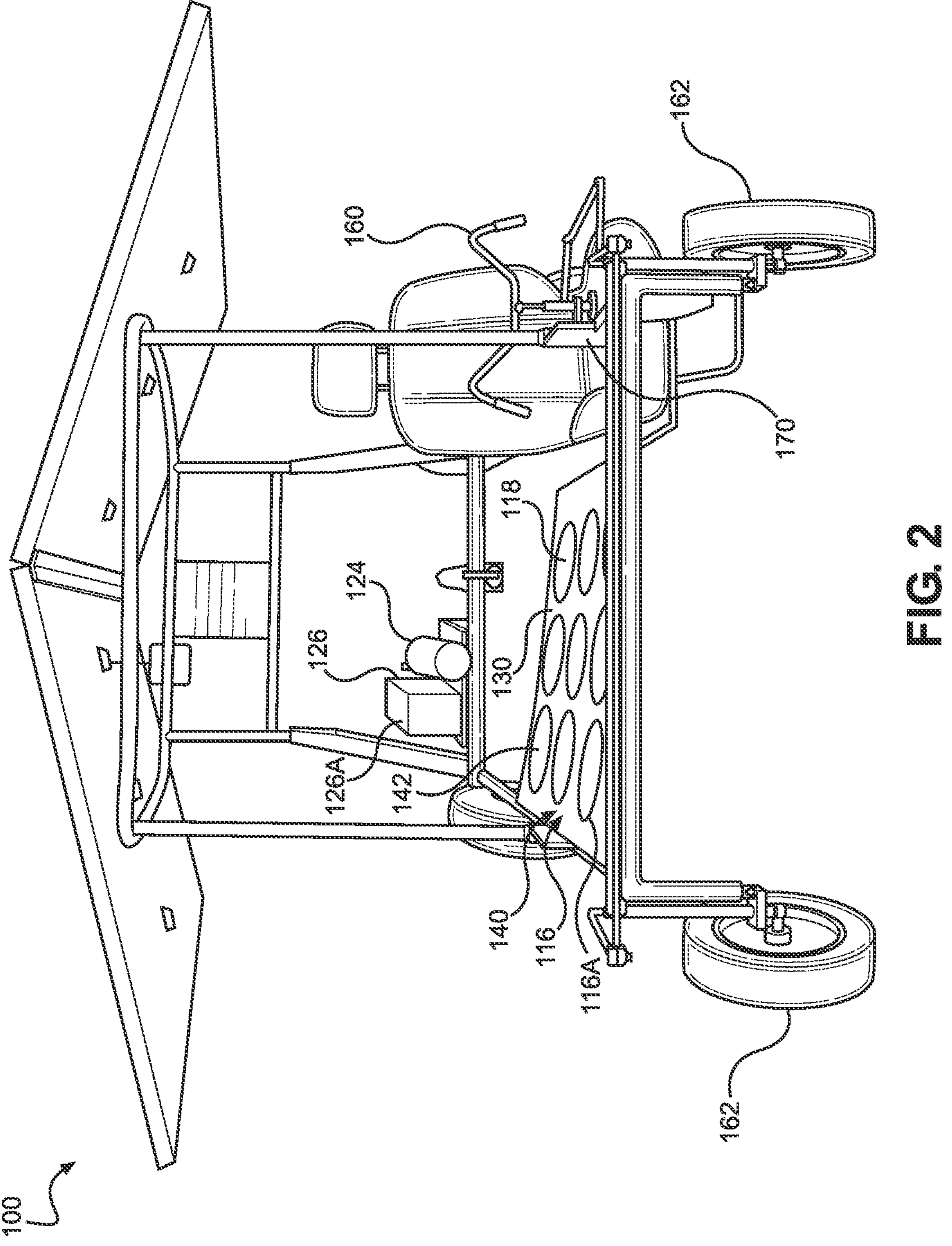
FIG. 2 shows a front perspective view of an embodiment of the hydraulic mobile cart.
Figure 3:
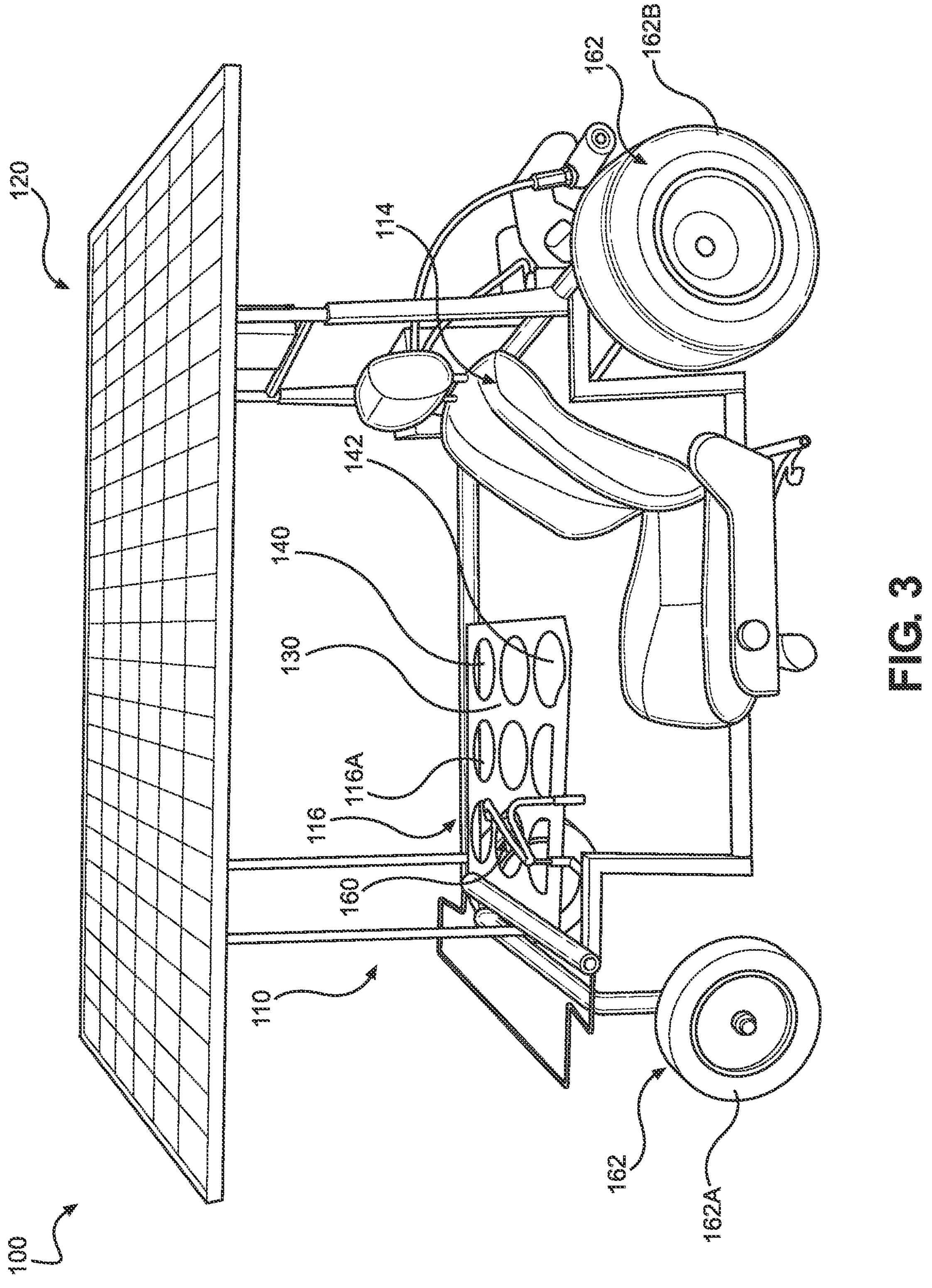
FIG. 3 shows a second side perspective view of an embodiment of the hydraulic mobile cart.

Referring now to FIGS. 2 and 3, there is shown a front view of an embodiment of the hydraulic mobile cart 100 and a second side view of an embodiment of the hydraulic mobile cart 100, respectively.

The hydraulic mobile cart 100 may also include a plurality of harvesting containers 140.

The harvesting containers 140 may be supported by the frame 112 and may include a plurality of interchangeable plates 142 for various types of the harvesting containers 140. In the illustrated embodiment, the harvest container holding plate 130 may be affixed to the frame 112 adjacent to the seating area 114.

In this manner, the hydraulic mobile cart 100 may support the harvesting containers 140 for deposition of one or more harvested goods as the hydraulic mobile cart 100 drives through one or more produce beds (not shown). As such, the hydraulic mobile cart 100 allows multiple beds of produce to be harvested in a single pass, thereby increasing the efficiency and simplicity of harvesting.

The wheels 162 may include a pair of front tires 162A and a pair of rear tires 162B. The pair of rear tires 162B may be relatively larger and wider than the pair of front tires 162A for a relatively smoother and comfortable ride and better ground traction.

Figure 5:
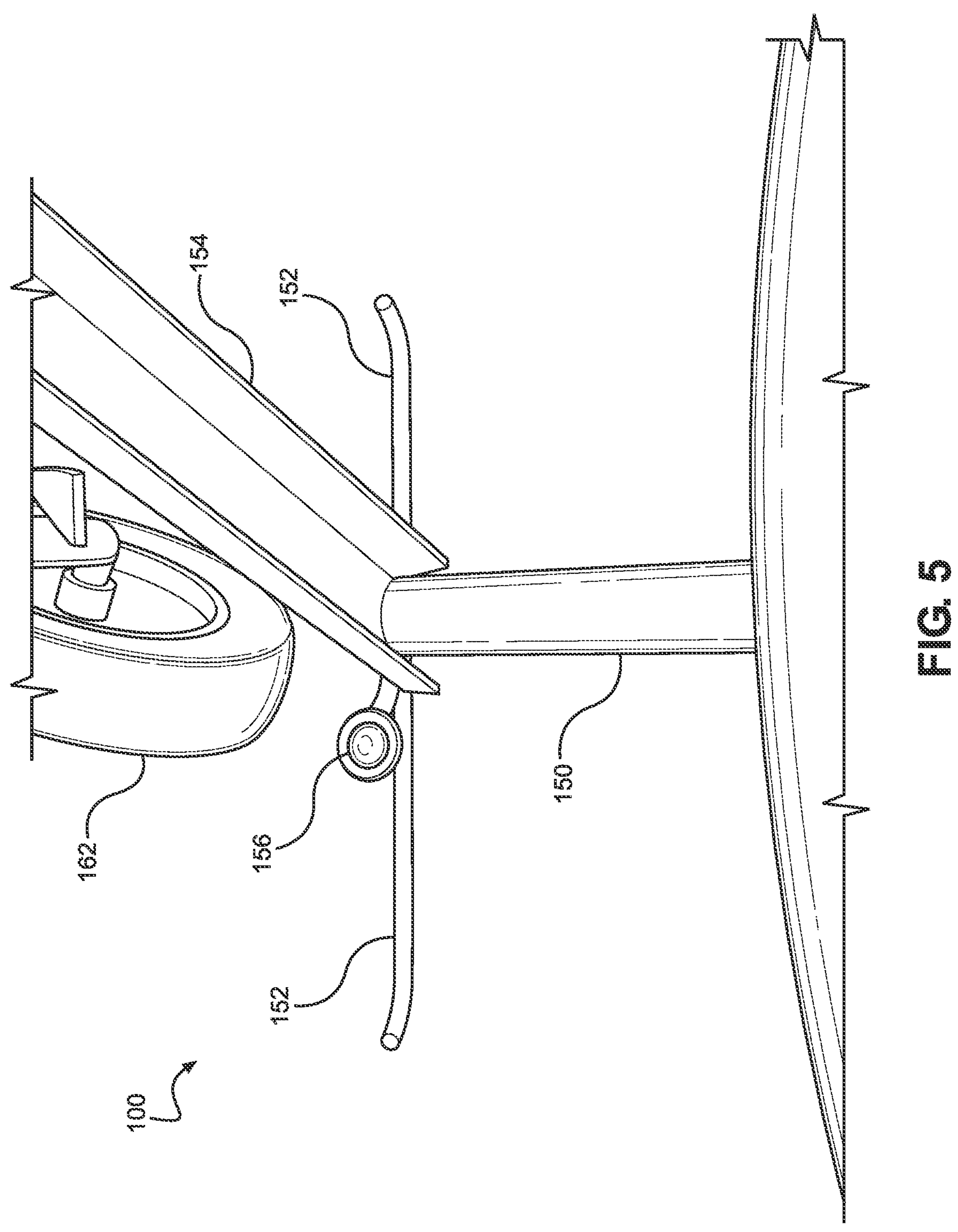
FIG. 5 shows an overhead perspective view an embodiment of the hydraulic mobile cart.

Referring now to FIG. 4 and FIG. 5 there is shown a rear view and an overhead perspective view of an embodiment of the hydraulic mobile cart 100.

The hydraulic mobile cart 100 may further include a footrest 152, a steering device 160, and a hand lever 170.

In the shown embodiment, the frame 112 may comprise a pair of opposing footrests 152 that extends from a support 150 upon which the cushioned sliding seat 128 slides, wherein the footrest 152 further comprises a motion push button 156 disposed thereon. The motion push button 156 may be configured to actuate the hydraulic drive motor 126 to drive the hydraulic mobile cart 100 when depressed.

The steering device 160 may be disposed on the frame 112, wherein the steering device 160 may be operably connected to a plurality of the front wheels 162A to allow the operator to adjust a direction of motion of the hydraulic mobile cart 100.

The hand lever 170 may be disposed within the seating area 114, wherein the hand lever 170 may be configured to selectively control forward and reverse motion of the hydraulic mobile cart 100. For example, the hand lever 170 may be configured to actuate the hydraulic drive motor 126 to drive the hydraulic mobile cart 100 forward when in a first position, and rearward when in a second position. In this manner, the operator may control the direction of motion of the hydraulic mobile cart 100, whether forwards or backwards.

Figure 6:
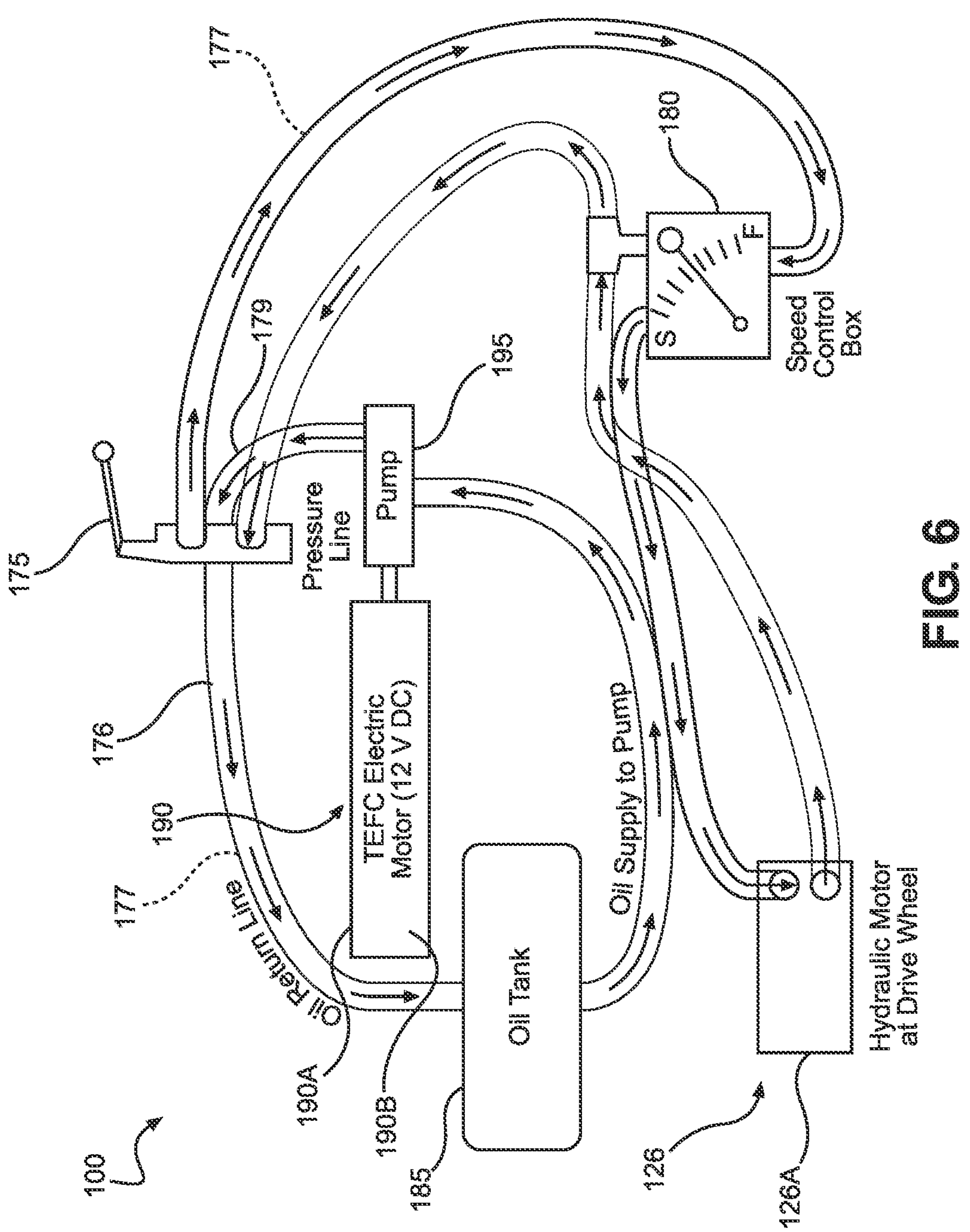
FIG. 6 shows a diagram of an embodiment of the hydraulic mobile cart.

FIG. 6 shows a diagram of an embodiment of the hydraulic mobile cart 100.

The diagram of the hydraulic mobile cart 100 may include a directional control valve 175, a speed control box 180, a hydraulic drive motor (FIG. 1, 126), a hydraulic oil tank 185, an electric motor 190, and a hydraulic pump 195.

The directional control valve 175 may transmit a plurality of hydraulic fluid 177 and may receive back the hydraulic fluid 177 transmitted.

The speed control box 180 may control the speed of the hydraulic fluid 177 being transmitted directly from the directional control valve 175. The hydraulic drive motor 126 may receive the hydraulic fluid 177 directly from the speed control box 180 and transmit the hydraulic fluid 177 directly back to the speed control box 180 and directly back to the directional control valve 175.

The hydraulic drive motor 126 may be disposed at the rear drive wheel 162B of the hydraulic mobile cart 100. The hydraulic drive motor 126 may be a continuous duty cycle motor 126A or the like to operate continuously without overheating or suffering damage.

The hydraulic oil tank 185 may directly receive the hydraulic fluid 177 via an oil return line 176 from the directional control valve 175. The hydraulic oil tank 185 may directly transmit the hydraulic fluid 177 to the hydraulic pump 195 which directly transmits the hydraulic fluid 177 back to the directional control valve 175 via a hydraulic pressure line 179.

The electric motor 190 may be a Totally Enclosed Fan-Cooled or TEFC electric motor 190A or the like that provides protection from environmental elements such as dust, dirt, water, and the like. The electric motor 190 may be a 12 V Direct Current or DC electric motor 190B or the like.

The hydraulic pump 195 may be electrically powered by the electric motor 190.

The flow of the hydraulic fluid 177 described in FIG. 6 indicates forward movement of the hydraulic mobile cart 100. The flow of the hydraulic fluid 177 may be in an opposite direction when the hydraulic mobile cart 100 moves in reverse.

Figure 7:
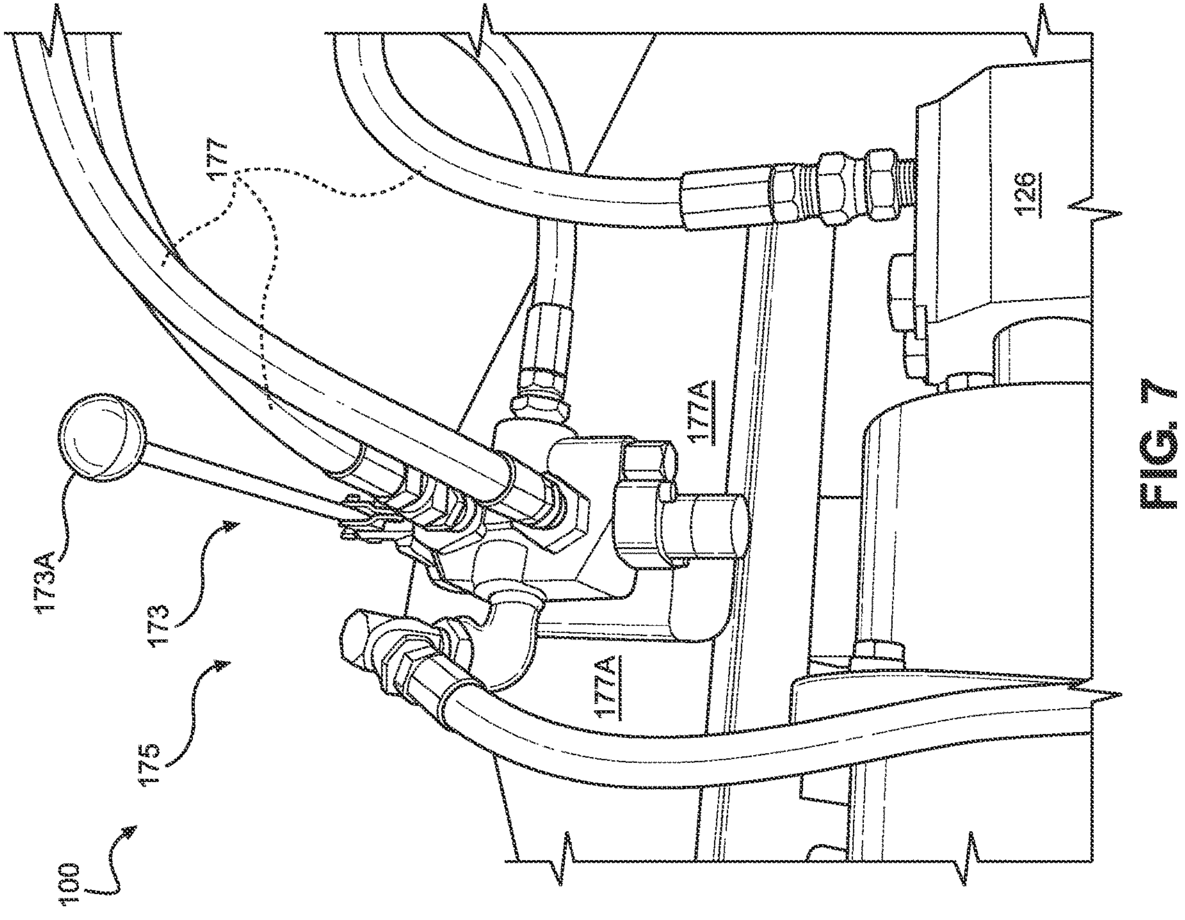
FIG. 7 shows a side perspective view an embodiment of a directional control valve of the hydraulic mobile cart.

FIG. 7 shows a perspective view an embodiment of a directional control valve 175 of the hydraulic mobile cart 100.

The directional control valve 175 may include a shift stick 173 to change the direction of flow of the hydraulic fluid 177 in the hydraulic mobile cart 100. The shift stick 173 may include a removable gripping ball 173A disposed on one end of the shift stick 173 to facilitate grasping the shift stick 173 and operating the directional control valve 175 to control the directional flow of the hydraulic fluid 177 in the hydraulic mobile cart 100. The removable gripping ball 173A may be screwed on to and off of the one end of the shift stick 173.

An oil catch pan 177A may be positioned underneath the pair of batteries 124 and the hydraulic drive motor 126 to catch any liquids or fluids that may possibly leak from the hydraulic drive motor 126 or the pair of batteries 124 to protect crops and the like from contamination.

Figure 8:
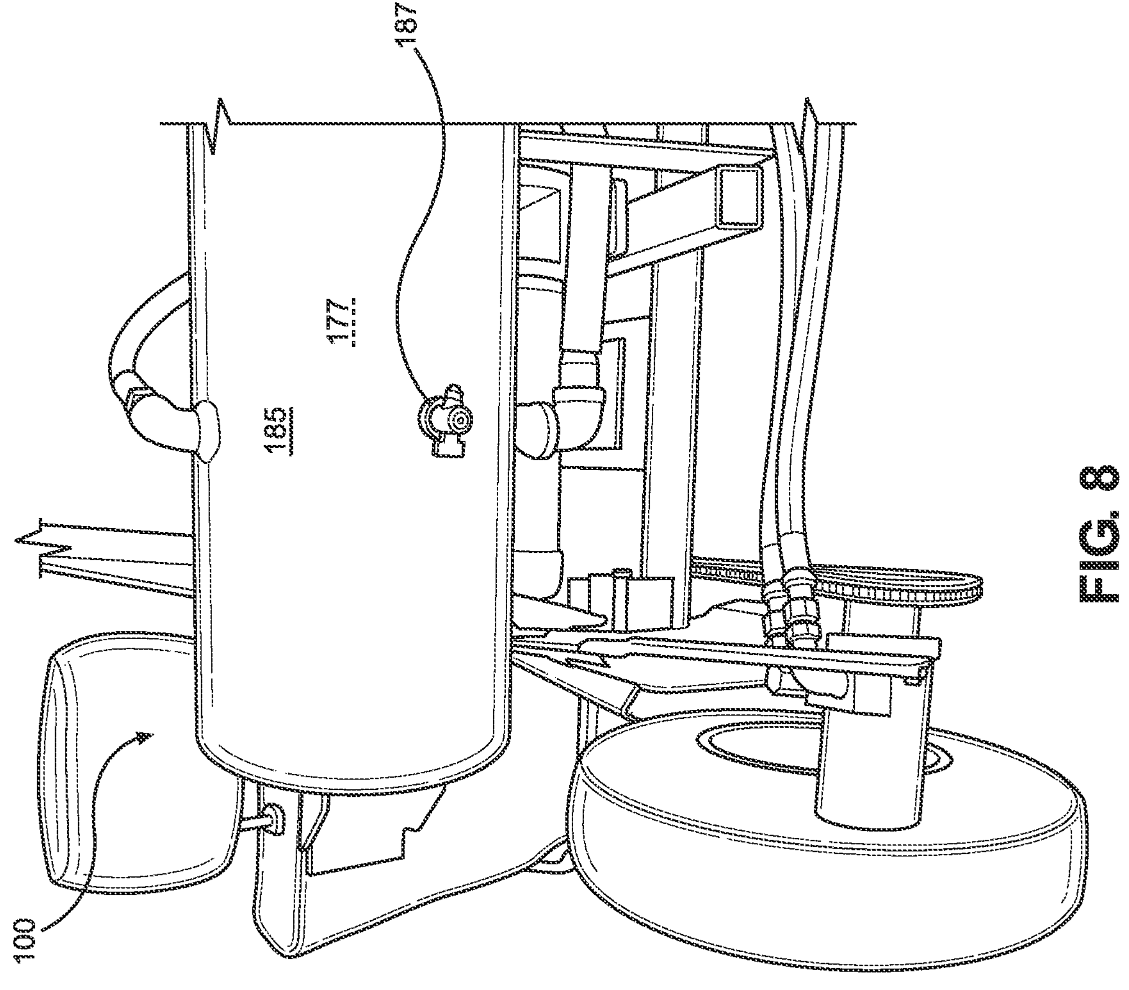
FIG. 8 shows a rear perspective view an embodiment of a hydraulic oil tank of the hydraulic mobile cart.

FIG. 8 shows a perspective view of an embodiment of a hydraulic oil tank 185 of the hydraulic mobile cart 100.

The hydraulic oil tank 185 may contain the hydraulic fluid 177 that is circulated throughout the hydraulic mobile cart 100. The hydraulic oil tank 185 may also be pressurized and may include a pressure relief valve 187 or the like to serves as a critical safety function by preventing overpressure within the hydraulic oil tank 185. The pressure relief valve 187 may be designed to open and allow excess fluid to escape when the pressure in the hydraulic oil tank 185 surpasses a predetermined set point.

Figure 9:
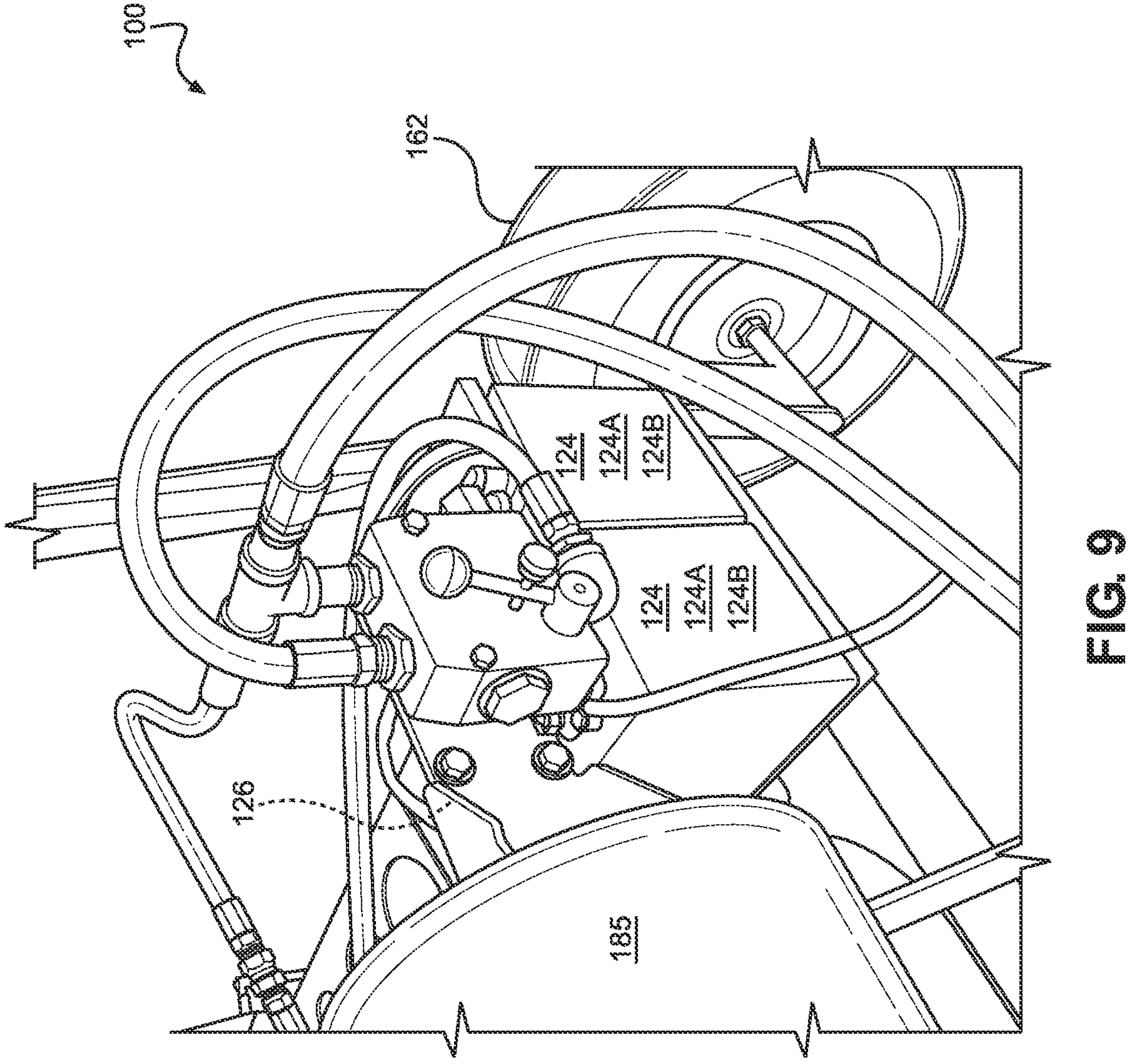
FIG. 9 shows a side perspective view an embodiment of a pair of batteries of the hydraulic mobile cart.

FIG. 9 shows a perspective view an embodiment of the pair of batteries 124 of the hydraulic mobile cart 100.

The pair of batteries 124 may be a pair of solar charged deep cycle batteries hooked in parallel 124A or the like. The pair of batteries 124 may be approximately 12V batteries 124B or the like.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. A hydraulic mobile cart, comprising:

a wheeled vehicle having a frame that includes a seating area adapted to be disposed in close proximity to a ground surface over which the wheeled vehicle travels to reduce bending and effort adapted to harvest a plurality of produce;

an upper canopy adapted to cover an operator and a plurality of picking areas adjacent to a pair of sides of the wheeled vehicle;

a plurality of solar panels disposed on the upper canopy, the solar panels charge a pair of batteries which power a hydraulic drive motor;

a plurality of harvesting containers supported by the frame, the harvesting containers include a plurality of interchangeable plates to accommodate a plurality of different types of the harvesting containers;

a harvest container holding plate affixed to the frame adjacent to the seating area;

further comprising a directional control valve transmitting a plurality of hydraulic fluid;

wherein the directional control valve includes a shift stick to change the direction of flow of the hydraulic fluid;

wherein the hydraulic fluid is in an opposite direction when the hydraulic mobile cart moves in reverse;

further comprising a rate of flow control box controlling a speed of the hydraulic fluid being transmitted directly from the directional control valve;

wherein the hydraulic drive motor receives the hydraulic fluid directly from the speed control box and transmits the hydraulic fluid directly back to the speed control box and directly back to the directional control valve;

further comprising a hydraulic oil tank directly receiving the hydraulic fluid via an oil return line from the directional control valve; and wherein the hydraulic oil tank directly transmits the hydraulic fluid to the hydraulic pump which directly transmits the hydraulic fluid back to the directional control valve via a hydraulic pressure line.

2. The hydraulic mobile cart, according to claim 1, wherein the seating area includes a cushioned sliding seat that slides along the horizontal support that is adapted to position the operator forward or rearward.

3. The hydraulic mobile cart, according to claim 1, wherein the harvest container holding plate comprises a plurality of circular apertures therethrough and the circular apertures are dimensioned to removably secure one of the harvesting containers therein.

4. The hydraulic mobile cart, according to claim 3, wherein the circular apertures are disposed in a regular grid pattern to evenly distribute weight across harvest container holding plate to support the harvesting containers for deposition of a plurality of harvested goods as the wheeled vehicle drives through one or more produce beds thereby increasing efficiency and simplicity.

5. The hydraulic mobile cart, according to claim 1, further comprising a footrest having a pair of opposing struts extending from a horizontal support upon which the cushioned sliding seat slides.

6. The hydraulic mobile cart, according to claim 5, wherein the footrest further comprises a motion push button disposed thereon to actuate the hydraulic drive motor to drive the hydraulic mobile cart.

7. The hydraulic mobile cart, according to claim 1, further comprising a steering device disposed on the frame, the steering device is operably connected to a plurality of wheels to allow the operator to adjust a direction of motion of the hydraulic mobile cart.

8. The hydraulic mobile cart, according to claim 1, further comprising a hand lever disposed within the seating area, the hand lever is configured to selectively control forward and reverse motion of the hydraulic mobile cart.

9. The hydraulic mobile cart, according to claim 1, further comprising an electric motor powered by the pair of batteries.

10. The hydraulic mobile cart, according to claim 9, wherein the electric motor is a Totally Enclosed Fan-Cooled or TEFC electric motor that provides protection from one or more environmental elements.

11. The hydraulic mobile cart, according to claim 9, wherein the electric motor is a 12V DC electric motor.

12. The hydraulic mobile cart, according to claim 9, wherein the pair of batteries are a pair of solar charged deep cycle batteries hooked in parallel.

13. The hydraulic mobile cart, according to claim 9, further comprising a hydraulic pump electrically powered by the electric motor.

* * * * *